United States Patent [19]
Cunningham

[11] 3,846,563
[45] Nov. 5, 1974

[54] QUICK-COOKING MACARONI PRODUCTS AND PROCESS

[75] Inventor: Thomas A. Cunningham, Cresskill, N.J.

[73] Assignee: Thomas J. Lipton, Inc., Englewood Cliffs, N.J.

[22] Filed: Oct. 1, 1973

[21] Appl. No.: 402,105

Related U.S. Application Data

[63] Continuation-in-part of Ser. No. 242,800, April 10, 1972, abandoned, which is a continuation-in-part of Ser. No. 143,271, May 13, 1971, abandoned.

[52] U.S. Cl.................. 426/158, 426/346, 426/343
[51] Int. Cl............................................... A23l 1/16
[58] Field of Search .......... 426/158, 343, 346, 451; 99/93

[56] References Cited
UNITED STATES PATENTS

| | | | |
|---|---|---|---|
| 3,138,462 | 6/1964 | Katz et al............................ | 426/451 |
| 3,615,677 | 10/1971 | Scharschmidt et al. ........ | 426/158 X |
| 3,762,931 | 10/1973 | Craig et al. ......................... | 426/346 |

Primary Examiner—S. Leon Bashore
Assistant Examiner—Arthur L. Corain
Attorney, Agent, or Firm—Brumbaugh, Graves, Donohue & Raymond

[57] ABSTRACT

Macaroni products containing at least 50 percent by weight of wheat flour which will rehydrate quickly in boiling water are obtained by forming a dough comprising water and at least partially precooked wheat flour, the dough optionally including other macaroni ingredients, extruding and forming the dough, and drying the formed dough to a stable moisture content.

17 Claims, No Drawings

QUICK-COOKING MACARONI PRODUCTS AND PROCESS

This application is a continuation-in-part of my co-pending application Ser. No. 242,800, filed Apr. 10, 1972, now abandoned, which, in turn, was a continuation-in-part of application Ser. No. 143,271, filed May 13, 1971, now abandoned.

The present invention relates to improvements in macaroni products such as spaghetti, macaroni, noodles and the like and to a process for making them. More particularly, the invention relates to noodles which rehydrate in less than a minute and a half following the addition thereto of boiling water and to a process of making the noodles. The noodles thus obtained are advantageously used as an ingredient of instant soup mixes.

BACKGROUND OF THE INVENTION

Conventional macaroni products require from 6 to 15 minutes of cooking time in boiling water in order to rehydrate and gelatinize the starch therein to the point where the product is ready to eat. To adapt macaroni products more readily to convenience food items, many attempts have been made in the art to reduce the cooking time of macaroni products. One such process is described in the Poole U.S. Pat. No. 2,704,723 wherein the macaroni product is precooked, prior to drying. These products have been found to be unsatisfactory because they still require a substantial cooking time in the order of 8 to 15 minutes and the cooked product has been found to have a slimy surface.

Another prior art process is described by the Kinsley et al. U.S. Pat. No. 3,192,049. In accordance with Kinsley, a dough containing hard wheat flour and a small portion of added protein in the form of soy flour or wheat gluten is extruded, gelatinized by water or steam cooking and dried. The products of the Kinsley process have been described as having a tendency to form a slimy surface and as having an undesirable flavor because of the presence of the added protein materials. Furthermore the Kinsley products require a substantial period of time, e.g., 4 to 12 minutes in water at 205° to 212°F for proper cooking.

High protein macaroni products containing corn flour, soy flour and optionally up to 30 percent by weight of wheat flour are described in the Scharschmidt U.S. Pat. No. 3,615,677. In the disclosure of this patent, one of the alternative embodiments relates to the use of pre-gelatinized corn flour in preparing the basic dough. The pre-gelatinized flour is used to improve the cohesiveness of the dough, which property is stated to be deficient because of the relatively low level or absence of wheat flour and its concomitant wheat gluten. While suggesting that pregelatinized corn flours or blends thereof with raw corn flour is useful to obtain an acceptable product, the patent teaches that not more than 30 percent of wheat flour can be used because of its skin forming nature. In the examples given in the patent, cooking times of about 6 minutes in boiling water was uniformly evidenced.

Thus, most of the prior art products have the disadvantage that while the product cooks more quickly than conventional macaroni products several minutes of boiling in water is still required, in order to rehydrate the product properly. In the art of making dehydrated soup mixes, many of these prior art products are quite acceptable inasmuch as the directions for making the soup require that the mix be boiled several minutes in water to rehydrate not only the noodles but the vegetables, meats and other ingredients of the mix.

The techniques for preparing dehydrated vegetable and meat products have recently been improved, and it is now possible to provide dehydrated soup ingredients which will rehydrate within a minute and a half after the addition of boiling water thereto. With soup mixes made with these materials, it is necessary only to add an appropriately measured quantity of the mix to a cup or bowl, thereafter add a measured amount of boiling water and stir, to provide a soup which is ready for consumption within a minute and a half. The only process known by which noodles can be prepared so that they will rehydrate within this period of time under these conditions is the technique of freeze-drying noodles. Most conventional processes of preparing quick-cooking noodles provide a product with an unacceptable long rehydration time. The freeze-drying process, while operable, is extremely expensive to operate, and the resulting product is, on rehydration, less noodle-like than is desired in the trade.

SUMMARY OF THE INVENTION

It has now been found that macaroni products containing at least 50 percent wheat flour can be made quicker cooking by forming a dough with water and an at least partially precooked wheat flour, forming the dough and drying it to a stable moisture content. More specifically, it has been found that noodles containing at least 50 percent wheat flour and capable of rehydrating satisfactorily in less than 1 ½ minutes following the addition of boiling water can be produced by forming a dough using water, a precooked wheat flour and optionally other noodle ingredients such as farina, semolina, egg yolk solids and salt. The dough is then formed into noodles using conventional extrusion and cutting techniques and the wet noodle pieces are dried to a moisture content of less than 6 percent.

DESCRIPTION OF THE INVENTION

The farinaceous ingredient of the present invention comprises at least 50 percent by weight of wheat flour. There must be a level of precooked flour in the formulation sufficient to provide cohesiveness in the dough to permit proper handling characteristics during the macaroni-forming operation. Furthermore, where it is desired, sufficient gelatinization must have occurred in the farinaceous ingredient so that when the final product is added to boiling water and allowed to stand for a short period of time, in the order of 1 ½ minutes, the product no longer contains a raw starch or doughy taste.

The desired characteristics of the farinaceous ingredient may be provided by a product based completely upon a precooked wheat flour. On the other hand, where desired, a portion of the precooked flour can be replaced by other farinaceous substances, such as semolina, durum, farina (as representative of wheat fractions), corn meal or corn flour, tapioca flour, or potato flour.

Other optional macaroni ingredients such as salt for flavoring purposes, and egg yolk solids where egg noodles or egg macaroni products are desired, can be used. Soy flour and other high protein materials may be added in moderate amounts to improve the nutritive value of the macaroni products of this invention.

One precooked flour which can be used according to the present invention is prepared by precooking a conventional flour, such as Marigold flour, supplied by the Peavey Milling Co., Minneapolis, Minn., a commercial blend of durum and hard winter wheat flour. In conducting the precooking step, the flour is combined with water sufficient to permit the desired degree of gelatinization, heated to bring about precooking, dried and ground to a suitable particle size, such as 100 percent through 40 mesh, or 100 percent through 20 mesh.

Specific precooking processes include a cooker-extruder technique. According to this method, the flour is moistened with about 10-20 percent water and passed through a cooker-extruder device such as a Fitzpatrick Malaxator, sold by the Fitzpatrick Co., Elmhurst, Ill. The device is preferably operated at a feed rate of 2,500 to 3,500 lbs./hr. with the addition of steam in the barrel of the extruder. The exit temperature of the cooked flour is preferably about 200°F. The extruded flour is formed into spheres or pellets of about 0.5 inches in diameter and air dried at 300°-500°F to 6-10 percent moisture. The dried pellets are then ground to a particle size of 100 percent through U.S. 40 mesh, or through U.S. 20 mesh, as desired.

Another cooker-extruder which is suitable is the Wenger type. This device has a capacity of 340 lbs. of flour per hour, and is preferably operated to provide a dough temperature of 200°-280°F in the dough just before it reaches the exit die. The extruded product from the Wenger device may be dried at 340°-350°F.

The precooked flour may also be provided by drumdrying an aqueous slurry of the flour, and grinding the material to 100 percent through 40 mesh or through 20 mesh particle size. A second alternative procedure is to cook macaroni 12-16 minutes in a Reitz continuous cooker, dry the cooked product, and to then grind it to a particle size of through 40 mesh.

The farina used according to the present invention is a wheat fraction containing about 9 percent protein. This material may be used either in a raw or precooked form. A pregelatinized form may be purchased on the market as H.O. Quick-Farina and is preferably milled to pass a 20 mesh screen. A suitable raw farina is available from International Milling Co., Buffalo, N.Y. The farina is used as a minor component of the complete flour content of the noodles. One suitable farina has specifications calling for 15 percent maximum moisture, 9 percent minimum protein and a sieve analysis of 100 percent through U.S. No. 20 mesh and 3 percent maximum through U.S. No. 100 mesh.

The precooked wheat flour of this invention may be cooked to varying degrees, depending on the level at which it will be used in the macaroni product, upon the level and type of protein that will be present in the dough, and upon whether it is desired that the macaroni product, on reconstitution, have a cooked flavor. Where the cooked flour is gelatinized to the extent of about 60 percent, a dough prepared therefrom is readily handled in conventional macaroni product-making equipment and a macaroni product prepared therefrom generally has a cooked taste. Excessive cooking, to the extent that water-holding properties of the flour is destroyed, is to be avoided. On the other hand, the flour should be cooked at least to the extent of 20 percent gelatinization, to provide the necessary cohesiveness in the dough, and to assist in preventing checking during rapid drying of the macaroni product.

The precooked flour and farina may suitably be combined in a proportion of four parts precooked flour to one part farina. Suitable products are made where the proportions vary from 3.5 to 4.5 parts of precooked flour to one part of farina.

Other ingredients of the noodles of the present invention include powdered egg yolk of the usual commercial spray-dried grade, and this may be replaced, in whole or in part, by whole egg powder where desired. The egg material may also be supplied as fresh or frozen egg products, with appropriate subsequent adjustments of moisture levels. The egg material should be present in the final product at a level of at least 5.5 percent based on egg yolk solids present. Higher levels of egg yolk solids may be used, where desired, up to about 11 percent.

The salt may be present at a level of approximately 3-5 percent in the final product, but it may be omitted if desired. Levels higher than this should generally be avoided because of taste consideration. In addition to salt, other seasonings can of course be added as desired.

Water is added to the mixture of materials to make a dough having a moisture content within the range of 35-43 percent. Moisture levels outside these ranges makes the handling and the subsequent extrusion of the dough more difficult.

The dough is handled in the usual manner by extruding it through standard macaroni product forming devices. Where noodles are desired, standard noodle-forming equipment is used to extrude the dough as a sheet. The sheet then optionally passes through folding rolls and finally through calendering rolls to a cutter, delivering pieces preferably sized at one-sixteenth inch wide, one-half inch long and a thickness of 0.028 ± 0.002 inch. Other suitable noodle dough thicknesses include 0.025 to 0.030 ± 0.002 inch.

The noodle pieces are then dried by passing them through a belt dryer at a temperature in the range of 140° to 260°F, preferably 220°-260°F, for a time sufficient to dry the product to a final moisture content of less than about 6 percent. This requires from 10 to 20 minutes residence time in a dryer. The product is then sifted to remove clumps of noodles, and is ready for use as desired. One suitable dryer is a Proctor and Schwartz atmospheric belt dryer.

One of the unexpected advantages of this invention is the finding that macaroni products can be dried within as little as 10 to 20 minutes without undergoing undesirable checking or fragmentation of the macaroni piece due to stresses within the macaroni product. It is well known that macaroni products such as spaghetti, macaroni elbows, and noodles must be dried for long periods of time under mild conditions. Otherwise, the exterior of the products dries before the interior portions, and stresses are set up during drying which cause cracks to open in the macaroni piece. Mild forms of this defect are termed "checking," and greatly diminish the value of the goods where it is found. In severe cases, the macaroni breaks into fine pieces.

The process and products of the present invention, by using precooked flour, avoid the problem of checking, while permitting drying to take place at elevated temperatures and within a short period of time.

The following specific examples further illustrate the process of the present invention:

EXAMPLE I

A precooked flour was prepared by slurrying Marigold flour in water at 10 percent solids concentration, heating the slurry to 190°–195°F, holding the slurry at this temperature for 10 minutes, and then roller-drying the slurry at 70 psig steam pressure in the drum. The dried material was ground to a particle size of through U.S. 40 mesh.

200g of the precooked flour was combined with 40g of H.O. Quick-Farina, a pregelatinized farina of CPC International, having a particle size of through 40 mesh and containing 9 percent maximum protein, 15g of spray-dried egg yolk and 225ml of warm tap water. This mixture was blended in a Hobart mixer with a dough hook until balls of moist dough were formed (about 20 minutes). When the dough was formed, 12.75g of salt was added with 5 minutes of additional mixing. The dough was then sheeted on a hand-operated noodle press, partially air-dried (10 minutes at room temperature to dry the surface), cut into thin strips 1/16 × ½ × 0.026 inch, and oven-dried for 10 minutes at 225°F. to 4 percent moisture.

The resulting noodles were placed in a chicken noodle soup mix, and 10 grams of the mix, containing 4 grams of noodles were reconstituted with six ounces of boiling water. The noodles showed an acceptable texture after 40 seconds.

EXAMPLE II

A precooked flour was obtained by cooking elbow macaroni for 16 minutes in a Reitz continuous cooker, air-drying the cooked macaroni, and grinding the precooked macaroni to a particle size of through 40 mesh. 18 lbs. of the precooked flour was combined with 4.5 lbs. of milled farina (through 40 mesh), 1-¼ lbs. of egg yolk powder and 1¼ lbs. of salt. The dough was made by adding to this material 13½ lbs. of water.

The dough was mixed in a Hobart mixer, as in Example I, and extruded as a thick sheet. The sheet was rolled, folded, and rolled again to a thickness of 0.028 ± 0.002 inch, and the thin sheet was cut into fine noodles and dried in a Proctor & Schwartz dryer at 240°F for 20 minutes. Upon testing, the dried product rehydrated in less than 1 ½ minutes after the addition thereto of boiling water.

EXAMPLE III

A precooked flour was prepared by a cooker-extruder technique. Marigold flour, a blend of durum and hard winter wheat flour, sold by the Peavey Milling Co., Minneapolis, Minn., was mixed with about 20 percent of its weight of water to provide a uniformly moistened flour and fed to a steam-jacketed, steam injected cooker-extruder. The cooker-extruder was a Fitzpatrick Malaxator, sold by the Fitzpatrick Co., Elmhurst, Ill., and included a barrel, a screw for carrying the flour from the inlet at one end of the barrel to and through an extrusion plate at the opposite end. Means are provided for injection of steam into the flour during its passage through the barrel. The device is operated at a feed rate of 3,000 lbs. per hour with the addition of sufficient steam to provide an outlet temperature of the extruded flour of about 200°F. The extruded precooked flour is formed into approximately spherical shaped pellets of about 0.5 inches in diameter. The pellets are dried in a forced air dryer at about 450°F to about 10 percent moisture. The dried pellets are then ground to provide a precooked flour having a particle size through U.S. 40 mesh.

The precooked flour was then used to prepare noodles according to the following formula:

|  | lbs. |
| --- | --- |
| Precooked flour | 719 |
| Farina | 180 |
| Spray-dried egg yolk powder | 54 |
| Coarse salt | 47 |
|  | 1000 |

The farina used in the above formula was a raw farina, a wheat fraction having a maximum protein content of 9 percent, supplied by the International Milling Co. of Buffalo, N.Y., and milled to pass through a U.S. 40 mesh screen.

A dough is made by combining the precooked flour, farina, salt and egg yolk powder with an amount of water sufficient to provide a dough with 42 percent moisture. The dough was mixed in a Clermont mixer-extruder until balls of moist dough were formed (about 20 minutes). The dough was then passed through standard noodle-forming equipment by extruding as a sheet, folding, and again rolled to provide a sheet having a thickness of 0.028 ± 0.002 inch. The sheet of dough was cut into thin 1/16 inch strips and then into ½ inch length pieces. The dough pieces were dried in a Proctor & Schwartz belt dryer at 245°F for 20 minutes to provide noodles of less than 6 percent moisture.

The noodles, on evaluation, were found to have a rehydration time of about a minute after addition of boiling water thereto (4 grams of noodles with 6 oz. of boiling water), and to have an excellent noodle flavor and texture.

EXAMPLE IV

A series of batches of instant noodles were prepared using the precooked flour, the formula and the procedures set forth in Example III above. In these several batches, the drying conditions were varied. A thermometer measured the temperature of the air stream in the dryer just before it contacted the noodles. Both temperature and residence time of the noodles inside of the dryer were varied as shown in Table I below.

Table 1

| RUN NO. |  | TEMPERATURE, °F THERMOMETER | PROCTOR BELT NO. 1 SPEED FT/MIN. | RESIDENCE TIME, MINUTES |
| --- | --- | --- | --- | --- |
| 1 |  | 244° | 5.2 | 2.8 |
| 2 |  | 210° | 3.00 | 4.83 |
| 3 |  | 221° | 3.24 | 4.47 |
| 4 |  | 234° | 3.64 | 3.98 |
| 5 |  | 190° | 2.35 | 6.17 |
| 6 |  | 190° | 0.97 | 14.95 |
| 7 | No sheet Former | 244° | 5.33 | 2.72 |
| 8 | do. | 244° | 4.29 | 3.38 |

In runs 7 and 8 the sheet former was bypassed. In all of the other runs the extruded sheet of dough was folded and rolled twice thereby causing a form of lamination of the noodle sheet prior to cutting.

All of the noodles prepared above were acceptable. Those dried at 190°F were not puffed as were the ones dried at 244°F. However, the 190° runs were of softer texture but were quite acceptable. The noodles prepared from the unfolded dough were not puffed and did not float. Otherwise they were quite acceptable as an instant noodle for use in an instant soup mix.

EXAMPLE V

A precooked flour was prepared in a Wenger cooker-extruder. Marigold flour, a blend of durum and hard winter wheat flour sold by the Peavey Milling Co., Minneapolis, Minn. and having 14.6 percent maximum moisture and 11 percent minimum protein content was mixed with about 20 percent of its weight of water to provide a uniformly moistened flour. This mixture was fed to a jacketed, steam-injected, screw cooker-extruder of the Wenger type. The apparatus was run at a rate of about 340 lbs. of flour through the unit per hour. The temperature of the dough in the cooker, at a point just before the exit die was 280°F.

The extruded precooked flour was formed into approximately spherical shaped pellets of about 0.5 inch in diameter. The pellets were dried in a forced air dryer, having a circulating air temperature of 340–350°F to a moisture level of about 10 percent. The dried pellets were then ground to provide a precooked flour having a particle size of through U.S. 20 mesh.

The precooked flour was then used to prepare noodles in small batches on laboratory scale equipment. Batches of dry ingredients totaling 2000 grams were mixed and sufficient moisture was then added to make a workable dough. Generally, the amount of moisture required was in the area of 50 percent. The dough was then extruded on a hand-operated noodle press to provide a sheet having a thickness of 0.028 ± 0.002 inch, and partially air dried (10 minutes at room temperature to dry the surface). The sheet of dough was cut into thin strips of approximately one-sixteenth × one-half inch. The noodles were then dried in the Proctor and Scwartz belt dryer at 240°F for 20 minutes to provide noodles of less than 6 percent moisture.

Upon examination, it was found that the flour cooked in this manner was about 60 percent gelatinized. The cooked starch had 564 milligrams of maltose per gram, as determined by a modification of Method 22-15, A.C.CC., *Cereal Laboratory Methods*, St. Paul, Minn. (1962). This indicates that approximately 60 percent of the starch in the flour was gelatinized by the cooking procedure.

A batch of noodles, A, was prepared based upon a 2,000g portion of dry ingredients containing 89.9 percent of the aforementioned precooked flour, 5.4 percent of egg yolk solids and 4.7 percent salt. The resulting noodles rehydrated within a minute and a half after the addition of boiling water to provide a noodle having a firm elastic texture, good eating qualities and a satisfactory proportion of the floating noodles.

A second batch of noodles, B, based upon a 2,000g batch of dry ingredients was prepared to contain 35.9 percent of the aforementioned precooked flour, 54 percent of farina, 5.4 percent egg yolk solids and 4.7 percent salt. The resulting noodles rehydrated within 1 ½ minutes of the addition of boiling water to provide a noodle of acceptable texture, acceptable eating quality and an acceptable proportion of floating noodles.

EXAMPLE VI

Two batches of precooked flour were prepared by the Malaxator cooker-extruder technique described in Example III. The outlet temperature of the extruded flour in the first run, A, was regulated to be about 170°–180°F. The outlet temperature for the second run, B, was adjusted to be about 200°F.

Laboratory scale 2,000g batches of noodles were prepared in accordance with the procedures outlined in Example V, using the precooked flour A, obtained using an exit temperature of 170°–180°F. A number of formulations are summarized below together with an evaluation of the resulting noodles:

a. 71.9% precooked flour A
18% farina
5.4% egg yolk solids
4.7% salt

The noodles obtained with this formulation rehydrated satisfactorily 1 ½ minutes after addition of boiling water, had a soft texture and did not float. They had a raw dough taste.

b. 89.9% precooked flour A
5.4% egg yolk solids
4.7% salt

These noodles rehydrated satisfactorily 1 ½ minutes after addition of boiling water, had a soft texture, and included some floating noodles. The noodles had a slightly raw taste.

c. 80% precooked flour A
10% farina
5.4% egg yolk solids
4.6% salt

The noodles from this batch rehydrated satisfactorily 1 ½ minutes after addition of boiling water, provided only a few floating noodles and had a fair texture.

d. 85% precooked flour A
5% farina
5.4% egg yolk solids
4.6% salt

These noodles rehydrated satisfactorily 1 ½ minutes after addition of boiling water, approximately 50 percent floated and the noodles had a slightly doughy taste.

The second batch of precooked flour, B, wherein the exit temperature was 200°F, was used to prepare the following 2,000g batches of noodles with the indicated result:

a. 71.9% precooked flour B
18% soy flour
5.4% egg yolk solids
4.7% salt

The soy flour was that sold under the trade name "SOYA FLUFF 200," which has an 8 percent maximum moisture content, a 58 percent minimum protein content and a sieve analysis of 80 percent minimum through U.S. No. 200 mesh. The resulting noodles rehydrated satisfactorily 1 ½ minutes after the addition of boiling water. Some of the noodles floated. All of the noodles had a good texture and eating quality.

b. 71.9% precooked flour B
18% corn flour
5.4% egg yolk solids
4.7% salt

The corn flour had a 5 percent maximum moisture content, a 7 percent minimum protein content and a sieve analysis of 65 percent minimum through U.S. No. 140 mesh. The resulting product rehydrated satisfactorily 1 ½ minutes after addition of boiling water. The resulting noodles had an unusual but not unpleasant texture.

c. 89.9% precooked flour B
5.4% egg yolk solids
4.7% salt

These noodles rehydrated satisfactorily 1 ½ minutes after addition of boiling water to provide a good quality noodle of acceptable texture.

d. 71.9% precooked flour B
18% semolina
5.4% egg yolk solids
4.7% salt

The noodles rehydrated 1 ½ minutes after addition of boiling water to provide a product of excellent texture and good eating quality.

e. 75.4% precooked flour B
18.9% farina
5.7% egg yolk solids
0% salt

This noodle had good rehydration characteristics, rehydrating 1 ½ minutes after addition of boiling water to provide a good quality noodle.

f. 80% precooked flour B
20% farina

These noodles rehydrated 1 ½ minutes after addition of boiling water to provide a noodle of good texture and flavor.

EXAMPLE VII

Precooked flour B from Example VI was used to make ring shaped noodles. The formulation used was as follows:

|  | lbs. |
| --- | --- |
| Precooked flour B | 17.5 |
| Farina, raw | 5.0 |
| Egg yolk powder | 1.35 |
| Salt | 1.18 |
|  | 25.030 |

All ingredients were premixed in dry condition. Sufficient water was added to the mixture to provide a dough having 40–42 percent water. After mixing, the dough was extruded, at 100°F, in an Ambrette pilot plant model pasta press through a ring die, the outside diameter of each ring being 0.21 inch. The wall thickness of each ring as extruded is 0.020 inch. The cut noodle rings are carried away from the die face with circulating air at 130°–140°F and taken to drying trays. The trays were then placed in Proctor & Schwartz tray dryers with up-through circulation, where the noodles were dried in 245°F circulating air for about 7 minutes, to about 6 percent moisture.

The noodles were rehydrated by placing 8 grams of noodles in 6 oz. of boiling water. About half of the noodles were floaters. After standing for one and one half minutes, the noodles were reconstituted to a good texture and eating quality.

EXAMPLE VIII

Precooked flour B from Example VI was used to make ring shaped noodles. The formulation used was as follows; follows:

|  | lbs. |
| --- | --- |
| Precooked flour B | 1050.0 |
| Farina, raw | 300.0 |
| Egg yolk powder | 81.0 |
| Salt | 70.5 |
| Vitamin enrichment supplement | .5 |
|  | 1502.0 |

All ingredients were premixed in a dry condition. Sufficient water was added to the mixture to provide a dough having 40–42 percent water. After thoroughly mixing, the dough was extruded at 100°F in a Clermont Pasta Press fitted with a teflon coated ring noodle die. The extruded dough was cut into rings directly at the die face with a rotary stainless steel bladed fly cutter.

The length (height of extruded cylinder) of each ring noodle as extruded was 0.045 ± 0.005 inch. The outside diameter was about 0.21 inch. The wall thickness was about 0.020 inch.

The cut noodle rings are carried away from the die face with circulating air at 130°–140°F and taken to a Proctor & Schwartz belt dryer, where they were dried on an endless belt with up-through circulation at 245°–250°F to a final moisture content of 4–5 percent.

The noodles were rehydrated by placing 8 grams thereof in 6 ounces of boiling water. The noodles reconstituted within 1 minutes to a good texture and eating quality.

I claim:

1. A method for preparing quick cooking macaroni products which comprises the steps of:
   a. combining a dry, at least partially precooked wheat flour, having from 20 percent to about 60 percent gelatinization, with water and other optional dough ingredients to form a manageable dough, the precooked flour being present at a level sufficient to provide cohesiveness in the dough to permit proper handling characteristics during the forming operation, while at the same time insuring a macaroni product which will rehydrate in less than a minute and a half following the addition thereto of boiling water;
   b. forming the dough into pieces of the desired configuration; and
   c. drying the dough pieces.

2. A method for making quick cooking macaroni products which comprises the steps of:
   a. combining a farinaceous ingredient, at least 50 percent of which is from wheat and including a precooked wheat flour, having from 20 percent to about 60 percent gelatinization, with water to provide a manageable dough having a moisture level of 35 to 43 percent, the precooked flour being present at a level sufficient to provide cohesiveness in the dough to permit proper handling characteristics during the forming operation, while at the same time insuring a macaroni product which will rehydrate in less than a minute and a half following the addition thereto of boiling water;
   b. forming the dough into pieces of the desired configuration; and
   c. drying the dough pieces.

3. A method for making quick-cooking noodles which comprises the steps of:
   a. precooking a wheat flour to achieve from 20 percent to about 60 percent gelatinization, followed by drying and grinding thereof;

b. combining the precooked flour with at least one ingredient selected from the group consisting of semolina, farina, corn flour, wheat flour, tapioca flour and potato flour to provide a flour component, at least 50 percent of which is derived from wheat, the precooked flour being present at a level sufficient to provide cohesiveness in the dough to permit proper handling characteristics during the forming operation, while at the same time insuring a macaroni product which will rehydrate in less than a minute and a half following the addition thereto of boiling water;

c. adding water to the mixture resulting from (b) above and mixing to provide a dough, sufficient water being added to provide a moisture level in the dough of 38–43 percent;

d. extruding, folding, calendering and cutting the dough to provide dough pieces of about 1/16 × ½ × 0.028 ± 0.002 inch thick; and e. drying the dough pieces at about 140°–260°F to a final moisture content of less than 6 percent.

4. A method for making quick-cooking noodles according to claim 3, wherein egg yolk solids are added to the flour component of (b).

5. A method according to claim 3, wherein salt is added to the flour component of (b).

6. A method according to claim 3, wherein soy bean flour is added to the flour component of (b).

7. A method according to claim 3, wherein step (c) is conducted at 220°–260°F for about 10–20 minutes.

8. A method according to claim 3, wherein step (a) is conducted by precooking the flour to achieve about 60 percent gelatinization, the precooked flour is dried and thereafter ground to a particle size of about through U.S. 20 mesh.

9. A method for making quick-cooking noodles which comprises the steps of:

a. providing a farinaceous ingredient, at least 50 percent of which is derived from wheat and including a precooked wheat flour, the flour being 20 percent to about 60 percent gelatinized, the precooked flour being present at a level sufficient to provide cohesiveness in the dough to permit proper handling characteristics during the forming operation, while at the same time insuring a macaroni product which will rehydrate in less than a minute and a half following the addition thereto of boiling water;

b. adding water to the mixture of (a) to provide a moisture level of 35–43 percent;

c. mixing to form a dough;

d. forming the dough into noodles; and e. drying the noodles at 220°–260°F to a moisture content of less than 6 percent.

10. The method of claim 9, wherein the farinaceous ingredient of (a) comprises precooked wheat flour and farina, each having a particle size of about through U.S. 20 mesh, and in the proportions, by weight, of between about 3.5 and 4.5 parts by weight of precooked flour to 1 part of farina.

11. The method of claim 10, wherein egg yolk solids are added to the mixture made in (a) above in an amount sufficient to provide a level of egg yolk solids in the dried noodle of from about 5 to about 11 percent.

12. The method of claim 9, wherein the precooked flour is about 60 percent gelatinized.

13. The method of claim 9, wherein salt is added to the farinaceous ingredient of (a) at a level of 3 to 5 percent by weight of the final noodle.

14. The method of claim 9, wherein soy bean flour is added to the farinaceous ingredient of (a).

15. The method of claim 9, wherein the farinaceous ingredient of (a) comprises precooked wheat flour and at least one additional material selected from the group consisting of semolina, farina, corn flour, wheat flour, tapioca flour and potato flour.

16. A rapid-rehydrating noodle characterized by its ability to rehydrate within a minute and a half on addition of boiling water thereto, prepared according to the process of claim 2.

17. A method for making quick-cooking noodles which comprises the steps of:

a. precooking a wheat flour to achieve from 20 percent to about 60 percent gelatinization, followed by drying and grinding thereof;

b. combining the precooked flour with at least one ingredient selected from the group consisting of semolina, farina, corn flour, wheat flour, tapioca flour and potato flour to provide a flour component, at least 50 percent of which is derived from wheat, the precooked flour being present at a level sufficient to provide cohesiveness in the dough to permit proper handling characteristics during the forming operation, while at the same time insuring a macaroni product which will rehydrate in less than a minute and a half following the addition thereto of boiling water;

c. adding water to the mixture resulting from (b) above and mixing to provide a dough, sufficient water being added to provide a moisture level in the dough of 38–43 percent;

d. extruding and cutting the dough to provide ring shaped dough pieces having an outside diameter of about 0.21 inch, a length of about 0.045 inch and a wall thickness of about 0.020 inch; and e. drying the dough pieces at about 245°–250°F to a final moisture content of about 5 percent.

* * * * *